US012800979B2

(12) United States Patent
Madjarov

(10) Patent No.: US 12,800,979 B2
(45) Date of Patent: Nov. 17, 2026

(54) FAST FREQUENCY-TUNABLE OPTICAL RELAY AND METHODS OF USE

(71) Applicant: Quantinuum LLC, Broomfield, CO (US)

(72) Inventor: Ivaylo Sashkov Madjarov, Lafayette, CO (US)

(73) Assignee: QUANTINUUM LLC, Broomfield, CO (US)

( * ) Notice: Subject to any disclaimer, the term of this patent is extended or adjusted under 35 U.S.C. 154(b) by 967 days.

(21) Appl. No.: 18/156,472

(22) Filed: Jan. 19, 2023

(65) Prior Publication Data

US 2023/0259001 A1 Aug. 17, 2023

Related U.S. Application Data

(60) Provisional application No. 63/268,087, filed on Feb. 16, 2022.

(51) Int. Cl.
*G02F 1/33* (2006.01)
*G02B 6/293* (2006.01)

(52) U.S. Cl.
CPC ........... *G02F 1/33* (2013.01); *G02B 6/29395* (2013.01)

(58) Field of Classification Search
CPC ......... G02F 1/33; G02F 1/11; G02B 6/29395; G02B 5/1828; G02B 27/106; G02B 27/1093
See application file for complete search history.

(56) References Cited

U.S. PATENT DOCUMENTS

| | | | | |
|---|---|---|---|---|
| 5,038,359 | A | 8/1991 | Pepper et al. | |
| 5,963,569 | A | 10/1999 | Baumgart et al. | |
| 10,951,002 | B1 | 3/2021 | Bohn et al. | |
| 11,513,418 | B2 * | 11/2022 | Duan | G02F 1/113 |

(Continued)

FOREIGN PATENT DOCUMENTS

| | | | |
|---|---|---|---|
| AU | 2020267250 | A1 | 6/2021 |
| CN | 101158797 | A | 4/2008 |

(Continued)

OTHER PUBLICATIONS

CN Notice of Allowance Mailed on Nov. 19, 2025 for CN Application No. 202310124403, 2 page(s).

(Continued)

*Primary Examiner* — John Bedtelyon
(74) *Attorney, Agent, or Firm* — ALSTON & BIRD LLP

(57) ABSTRACT

A frequency-tunable optical relay comprising one acousto-optic device (AOD) in a double pass configuration is provide. The AOD is configured to receive (a) an input optical beam propagating in a first direction toward the AOD from a first side of the AOD and (b) an electrical driving signal. The optical relay further comprises an output optical element array comprising a plurality of output optical elements disposed on the first side of the AOD. Each output optical element of the plurality of output optical elements is configured to provide a respective output optical beam substantially propagating either parallel or anti-parallel to a second direction. The plurality of output optical elements are spaced apart from one another in a third direction, which is transverse to both the first direction and the second direction.

20 Claims, 6 Drawing Sheets

(56) References Cited

U.S. PATENT DOCUMENTS

Figure 1:
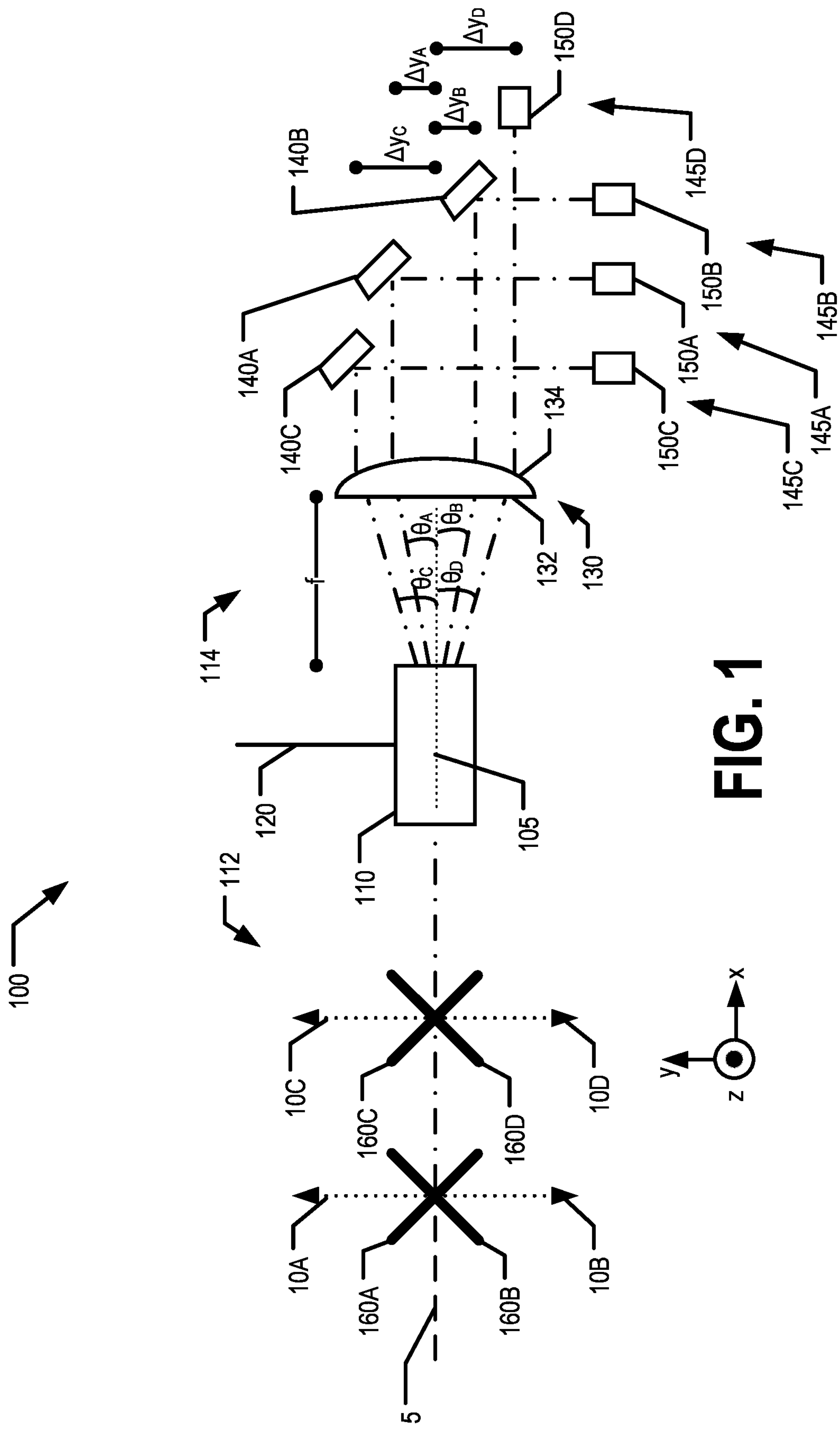

| | | | |
|---|---|---|---|
| 2012/0002917 A1 | 1/2012 | Colbourne |
| 2014/0153081 A1 | 6/2014 | Kirkby et al. |
| 2019/0331981 A1 | 10/2019 | Ismail |
| 2021/0063715 A1 | 3/2021 | Kremer et al. |
| 2021/0226406 A1 | 7/2021 | Brookhyser et al. |
| 2021/0389522 A1 | 12/2021 | Rowe et al. |

FOREIGN PATENT DOCUMENTS

| | | | |
|---|---|---|---|
| CN | 107177717 | A | 9/2017 |
| CN | 113780567 | A | 12/2021 |
| JP | 08-110498 | A | 4/1996 |
| JP | 10-275357 | A | 10/1998 |
| JP | 2005-034859 | A | 2/2005 |
| JP | 2008-129535 | A | 6/2008 |
| TW | 202001393 | A | 1/2020 |

OTHER PUBLICATIONS

English translation of CN Notice of Allowance dated Nov. 19, 2025 for CN Application No. 202310124403, 2 page(s).
Donley, E. A., et al., "Double-pass acousto-optic modulator system", Review of Scientific Instruments, Jun. 1, 2005, pp. 063112-1 thru 063112-6, vol. 76, American Institute of Physics, U.S.
Endres, M., et al. "Atom-by-atom assembly of defect-free one-dimensional cold atom arrays", Science, Nov. 3, 2016, 9 pages, American Association for the Advancement of Science, U.S.
English Translation of TW Office Action, including Search Report, dated Jan. 25, 2024 for TW Application No. 112105298, 7 page(s).
Extended European Search Report Mailed on Jul. 6, 2023 for EP Application No. 23156036, 11 page(s).
Moeller, Lukas, "Set up of a double pass AOM system for an ion trap experiment", dated Oct. 30, 2018, 7 pages, retrieved from the Internet at https://ethz.ch/content/dam/ethz/special-interest/phys/quantum-electronics/tiqi-dam/documents/semester_theses/semesterproject-Lukas-Moeller on Feb. 22, 2024.
Nägerl, H. C., et al., "Laser addressing of individual ions in a linear ion trap", Physical Review A., Jul. 1999, pp. 145-148, vol. 60, No. 1, The American Physical Society, US.
Riza, Nabeel A., "Acousto-optically switched optical delay lines", Optics Communications, Jan. 1, 1988, pp. 15-20, vol. 145, Elsevier Science B.V., Netherlands.
TW Office Action, including Search Report, Mailed on Jan. 25, 2024 for TW Application No. 112105298, 7 page(s).
English translation of TW Notice of Allowance dated Aug. 20, 2024 for TW Application No. 112105298, 6 page(s).
TW Notice of Allowance Mailed on Aug. 20, 2024 for TW Application No. 112105298, 6 page(s).
CN Office Action, including Search Report Mailed on Jul. 1, 2025 for CN Application No. 202310124403, 7 page(s).
English Translation of CN Office Action, including Search Report, dated Jul. 1, 2025 for CN Application No. 202310124403, 7 page(s).
Communication about intention to grant a European patent Mailed on Sep. 5, 2025 for EP Application No. 23156036, 6 page(s).
JP Office Action Mailed on Mar. 11, 2024 for JP Application No. 2023020781, 8 page(s).
English translation of JP Decision to Grant dated Jul. 16, 2024 for JP Application No. 2023020781, 2 page(s).
JP Decision to Grant Mailed on Jul. 16, 2024 for JP Application No. 2023020781, 3 page(s).
Decision to grant a European patent Mailed on Jan. 9, 2026 for EP Application No. 23156036, 2 page(s).

* cited by examiner

FAST FREQUENCY-TUNABLE OPTICAL RELAY AND METHODS OF USE

CROSS-REFERENCE TO RELATED APPLICATIONS

This application claims priority to U.S. Application No. 63/268,087, filed Feb. 16, 2022, the content of which is incorporated herein by reference in its entirety.

TECHNICAL FIELD

Various embodiments relate to optical beam delivery systems that include a fast frequency-tunable optical relay. Various embodiments relate to providing optical beams using a fast frequency-tunable optical relay.

BACKGROUND

In various applications, optical beams may be provided to one or more utilization locations. For example, an atom, ion, molecule, and/or the like may be located at a utilization location and one or more optical beams may be provided to the utilization location to interact with the atom, ion, molecule, and/or the like. A system may include a plurality of utilization locations to which it is desirable to be able to provide optical beams. Due to the monetary and physical space costs of lasers, it is impractical for the system to include a laser for each of utilization locations. However, conventional techniques for providing an optical beam from one laser to multiple utilization locations include the use of optical relays that each include multiple electro-optical devices (AODs; e.g., electro-optic modulators, electro-optic deflectors). However, these conventional optical relays also have significant monetary and physical space costs. Through applied effort, ingenuity, and innovation many deficiencies of such optical beam delivery systems have been solved by developing solutions that are structured in accordance with the embodiments of the present invention, many examples of which are described in detail herein.

BRIEF SUMMARY OF EXAMPLE EMBODIMENTS

Example embodiments provide fast frequency-tunable optical relay, systems that include fast frequency-tunable optical relays, and method for use thereof. In various embodiments, a fast frequency-tunable optical relay comprises one acousto-optic device (AOD; e.g., acousto-optical modulator, acousto-optical deflector, and/or the like). In various embodiments, the fast frequency-tunable optical relay is arranged and/or configured to switch between output optical beam configurations on timescales in the range of 100 ns to 100 μs (e.g., a couple microseconds).

According to one aspect, frequency-tunable optical relay is provided. In an example embodiment, the optical relay comprises one acousto-optic device (AOD) in a double pass configuration and configured to receive (a) an input optical beam propagating in a first direction toward the AOD from a first side of the AOD and (b) an electrical driving signal. The optical relay further comprises an output optical element array comprising a plurality of output optical elements disposed on the first side of the AOD. Each output optical element of the plurality of output optical elements is configured to provide a respective output optical beam substantially propagating either parallel or anti-parallel to a second direction. The plurality of output optical elements are spaced apart from one another in a third direction. The third direction is transverse to both the first direction and the second direction.

In an example embodiment, the optical relay further comprises a plurality of reflective optical assemblies disposed on a second side of the AOD, the second side of the AOD being opposite the first side of the AOD; and a parallelizing lens disposed between the AOD and the plurality of reflective optical assemblies, wherein each reflective optical assembly of the plurality of reflective optical assemblies corresponds to an output optical element of the plurality of output optical elements, and wherein each reflective optical assembly of the plurality of reflective optical assemblies is configured to cause at least a portion of an intermediate optical beam that exited the AOD to the second side of the AOD and propagated through the parallelizing lens to return to the AOD via the parallelizing lens.

In an example embodiment, each output optical element of the plurality of output optical elements and each reflective optical assembly corresponds to a respective frequency range of the electrical driving signal.

In an example embodiment, the respective frequency range corresponding to a respective reflective optical assembly of the plurality of reflective optical assemblies is determined by a physical location of at least one component of the respective reflective optical assembly with respect to the AOD.

In an example embodiment, respective frequency range corresponding to a respective output optical element of the plurality of output optical elements is determined based on a position of the respective output optical element in the third direction.

In an example embodiment, the respective frequency range corresponding to a respective output optical element of the plurality of output optical elements is independent of a position of the respective output optical element in the first direction and the second direction.

In an example embodiment, the respective frequency range has a range width of 1 to 20 MHz.

In an example embodiment, each reflective optical assembly of the plurality of reflective optical assemblies comprises a retro-reflecting prism.

In an example embodiment, at least one reflective optical assembly of the plurality of reflective optical assemblies comprises a sharp-edged mirror configured to direct the at least a portion of the intermediate beam to the retro-reflecting prism of the at least one reflective optical assembly.

In an example embodiment, the parallelizing lens is a cat's eye lens.

In an example embodiment, the parallelizing lens defines a focal length and the parallelizing lens is disposed a distance from the AOD corresponding to the focal length.

In an example embodiment, the plurality of output optical elements comprises two to eight optical elements.

In an example embodiment, a driving frequency profile of the electrical driving signal controls which one or more output optical elements of the plurality of output optical elements provides a respective output optical beam.

In an example embodiment, the AOD is configured to modulate a frequency profile of the input optical beam based at least in part on the electrical driving signal.

According to another aspect, an optical beam delivery system is provided. In an example embodiment, the optical beam delivery system comprises one or more input optical paths each configured to receive a respective input optical beam from a respective beam source and provide the respective input optical beam to a respective frequency-tunable optical relay. The optical beam delivery system comprises one or more frequency-tunable optical relays, including the respective frequency-tunable optical relay. The respective frequency-tunable optical relay comprises one acousto-optic device (AOD) in a double pass configuration and configured to receive (a) the respective input optical beam propagating in a first direction toward the AOD from a first side of the AOD and (b) a respective electrical driving signal. The respective frequency-tunable optical relay further comprises an output optical element array comprising a plurality of output optical elements disposed on the first side of the AOD. Each output optical element of the plurality of output optical elements is configured to provide a respective output optical beam substantially propagating either parallel or anti-parallel to a second direction. The plurality of output optical elements are spaced apart from one another in a third direction. The third direction is transverse to both the first direction and the second direction. The optical beam delivery system further comprise one or more output optical paths each configured to receive a respective output optical beam from a respective output optical element and provide the respective output optical beam to at least one respective beam utilization location.

In an example embodiment, the at least one respective beam utilization location is at least one position within an atomic object confinement apparatus.

In an example embodiment, the respective frequency-tunable optical relay further comprises a plurality of reflective optical assemblies disposed on a second side of the AOD, the second side of the AOD being opposite the first side of the AOD; and a parallelizing lens disposed between the AOD and the plurality of reflective optical assemblies, wherein each reflective optical assembly of the plurality of reflective optical assemblies corresponds to an output optical element of the plurality of output optical elements, and wherein each reflective optical assembly of the plurality of reflective optical assemblies is configured to cause at least a portion of an intermediate optical beam that exited the AOD to the second side of the AOD and propagated through the parallelizing lens to return to the AOD via the parallelizing lens.

In an example embodiment, each output optical element of the plurality of output optical elements and each reflective optical assembly corresponds to a respective frequency range of the respective electrical driving signal, the respective frequency range that corresponds to a respective reflective optical assembly of the plurality of reflective optical assemblies is determined by a physical location of at least one component of the respective reflective optical assembly with respect to the AOD, and the respective frequency range corresponding to a respective output optical element of the plurality of output optical elements is determined based on a position of the respective output optical element in the third direction.

In an example embodiment, the AOD is configured to modulate a frequency profile of the respective input optical beam based at least in part on the respective electrical driving signal.

According to yet another aspect, a method performed by a controller configured to control the provision of optical signals along one or more of a plurality of optical paths is provided. In an example embodiment, the method comprises determining, based on one or more computer-executable instructions, one or more particular optical paths of the plurality of optical paths along which a respective optical beam is to be provided; identifying a respective frequency range associated with a respective one of each of the one or more particular optical paths; causing an optical source to provide an input optical beam; and causing an electrical driving signal having a frequency profile comprising at least one component corresponding to the respective frequency range to be applied to an acousto-optic device (AOD) of a respective frequency-tunable optical relay. The respective frequency-tunable optical relay is configured to, responsive to receiving the electrical driving signal and the input optical beam by the AOD, provide the respective output optical beam to the one or more particular optical paths.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram of a top view of an example fast frequency-tunable optical relay, in accordance with an example embodiment.

Figure 2:
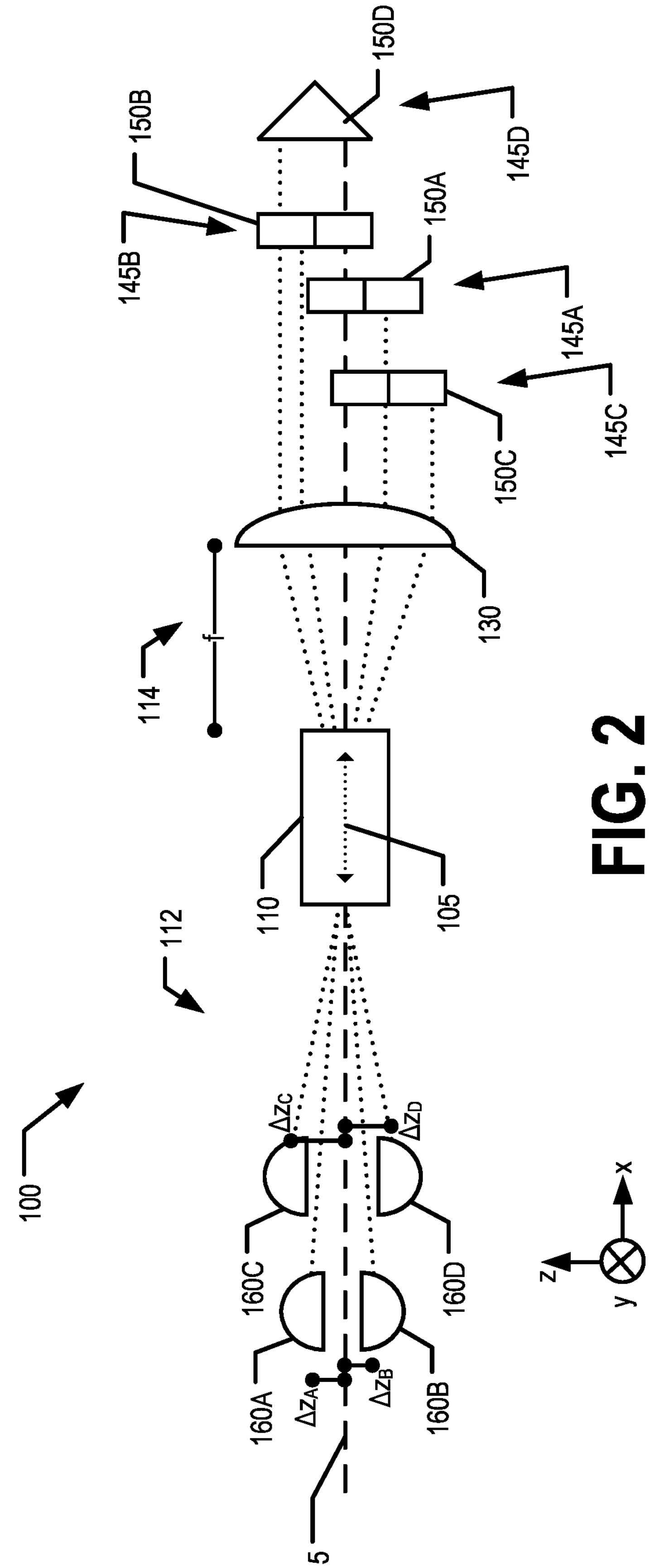

FIG. 2 provides a schematic diagram of a side view of the example fast frequency-tunable optical relay shown in FIG. 1.

Figure 3:
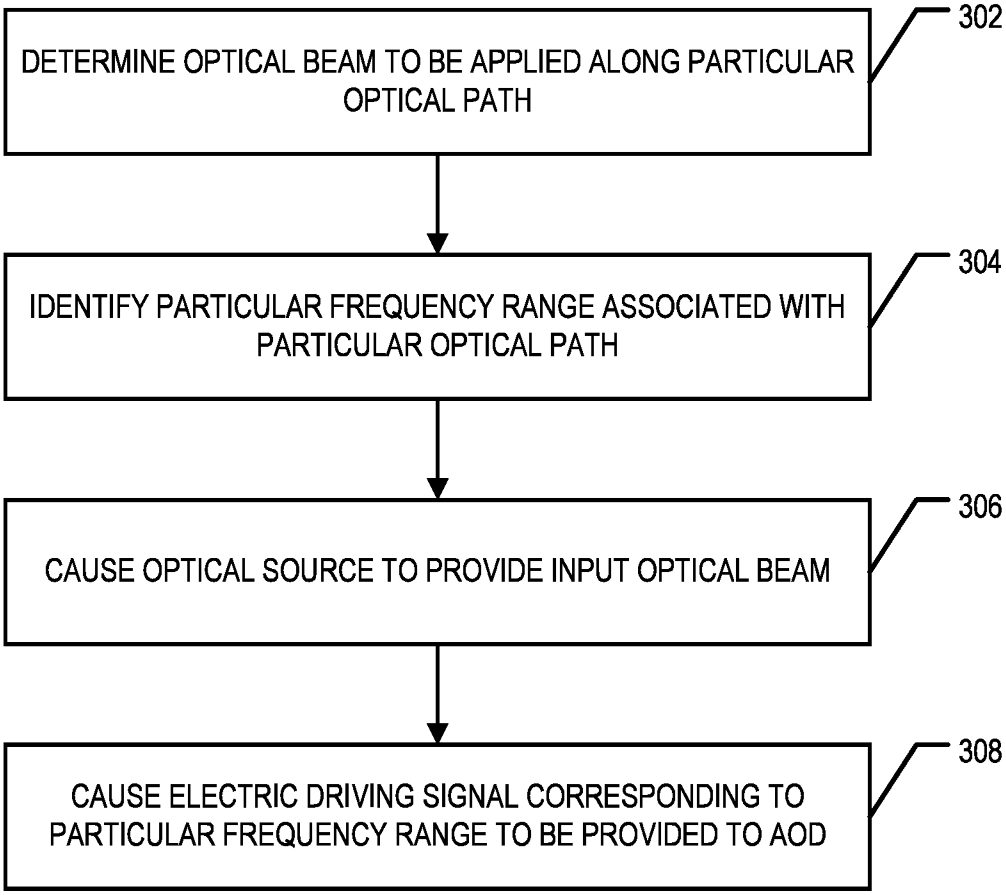

FIG. 3 provides flowchart illustrating processes, procedures, and/or operations for providing optical beams to utilization locations using a fast frequency-tunable optical relay, in accordance with an example embodiment.

Figure 4:
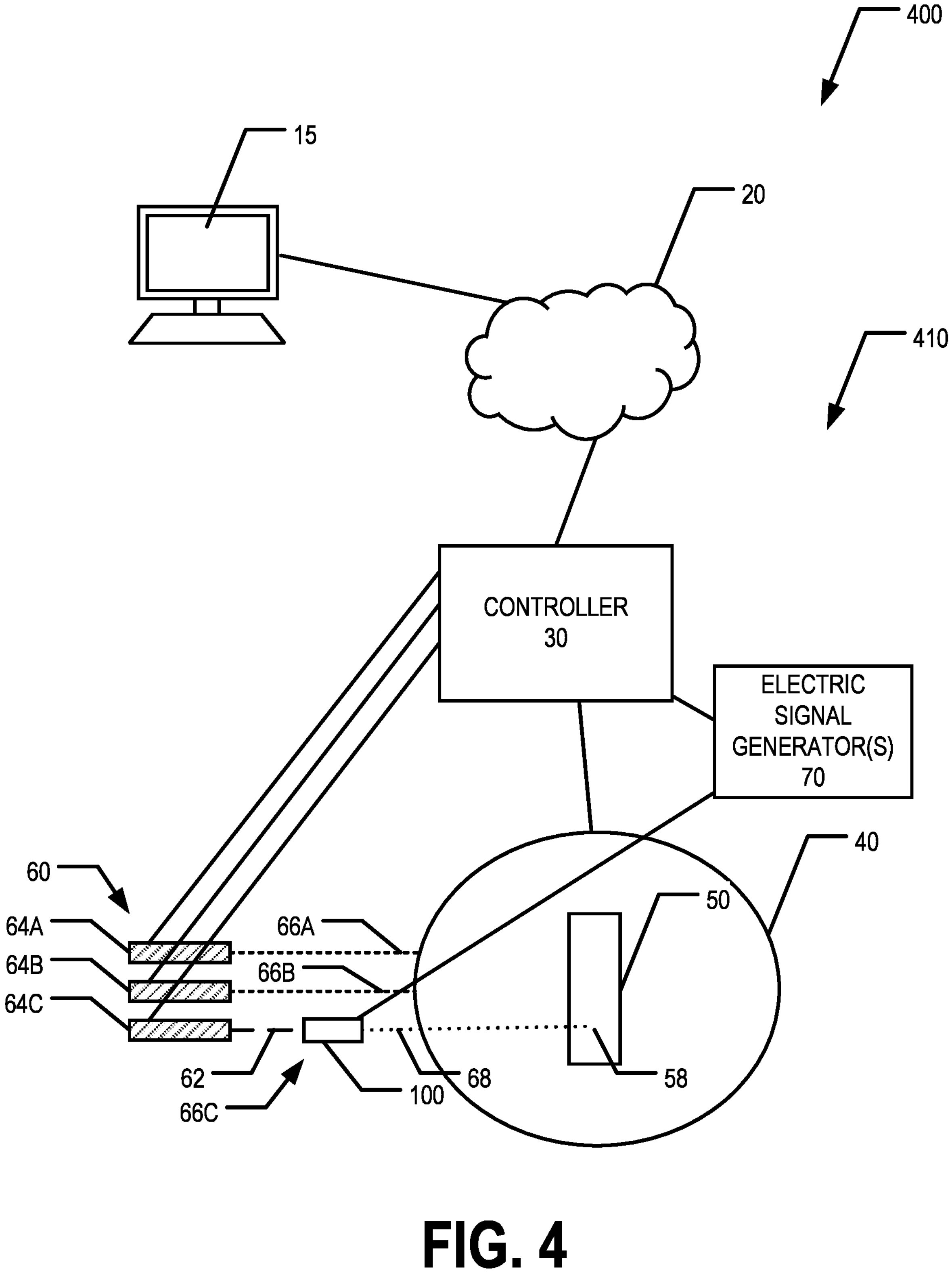

FIG. 4 provides a block diagram of an example trapped ion quantum computer comprising a fast frequency-tunable optical relay of an example embodiment.

Figure 5:
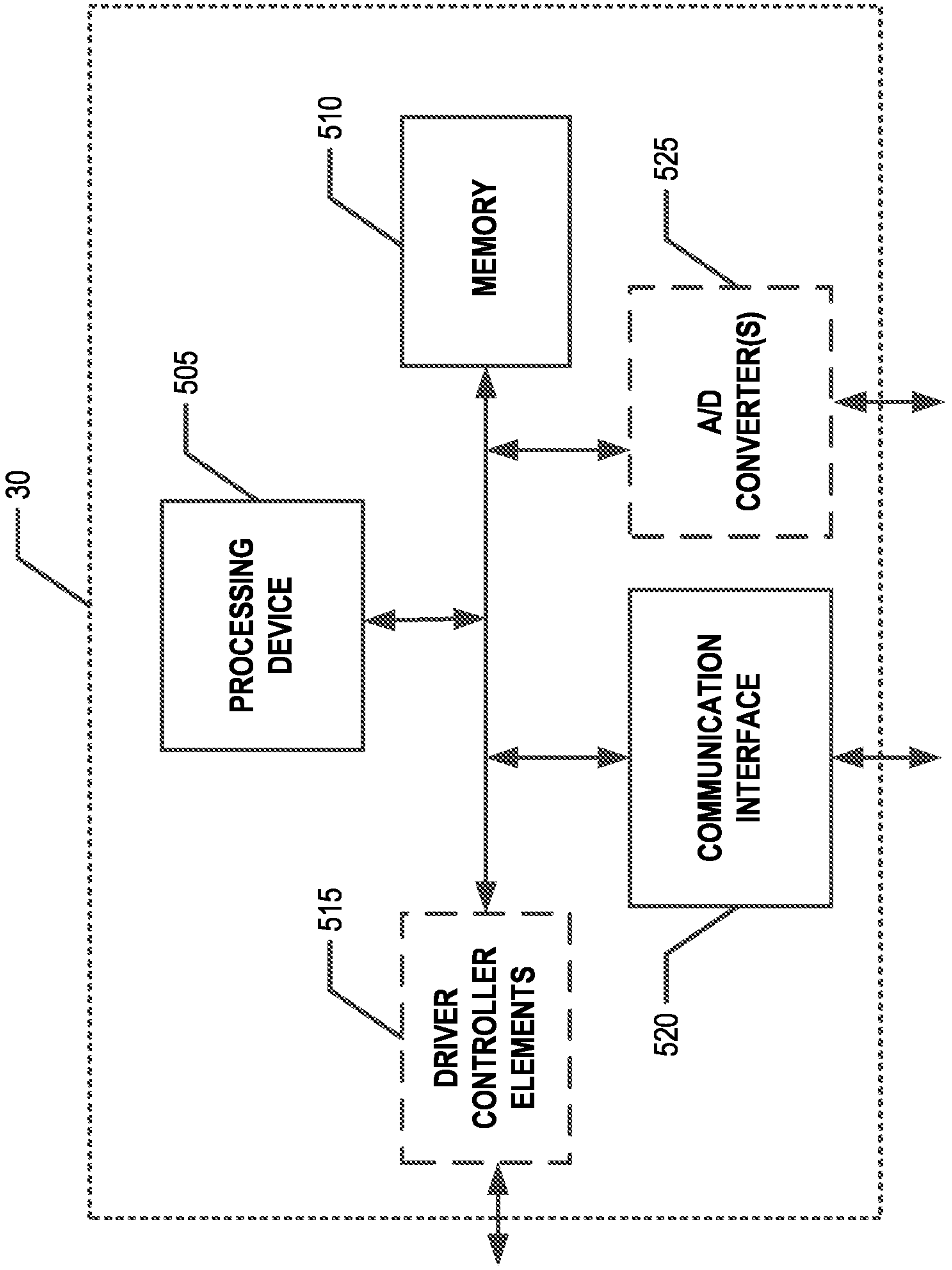

FIG. 5 provides a schematic diagram of an example controller of a quantum computer comprising an ion trap apparatus, in accordance with an example embodiment.

Figure 6:
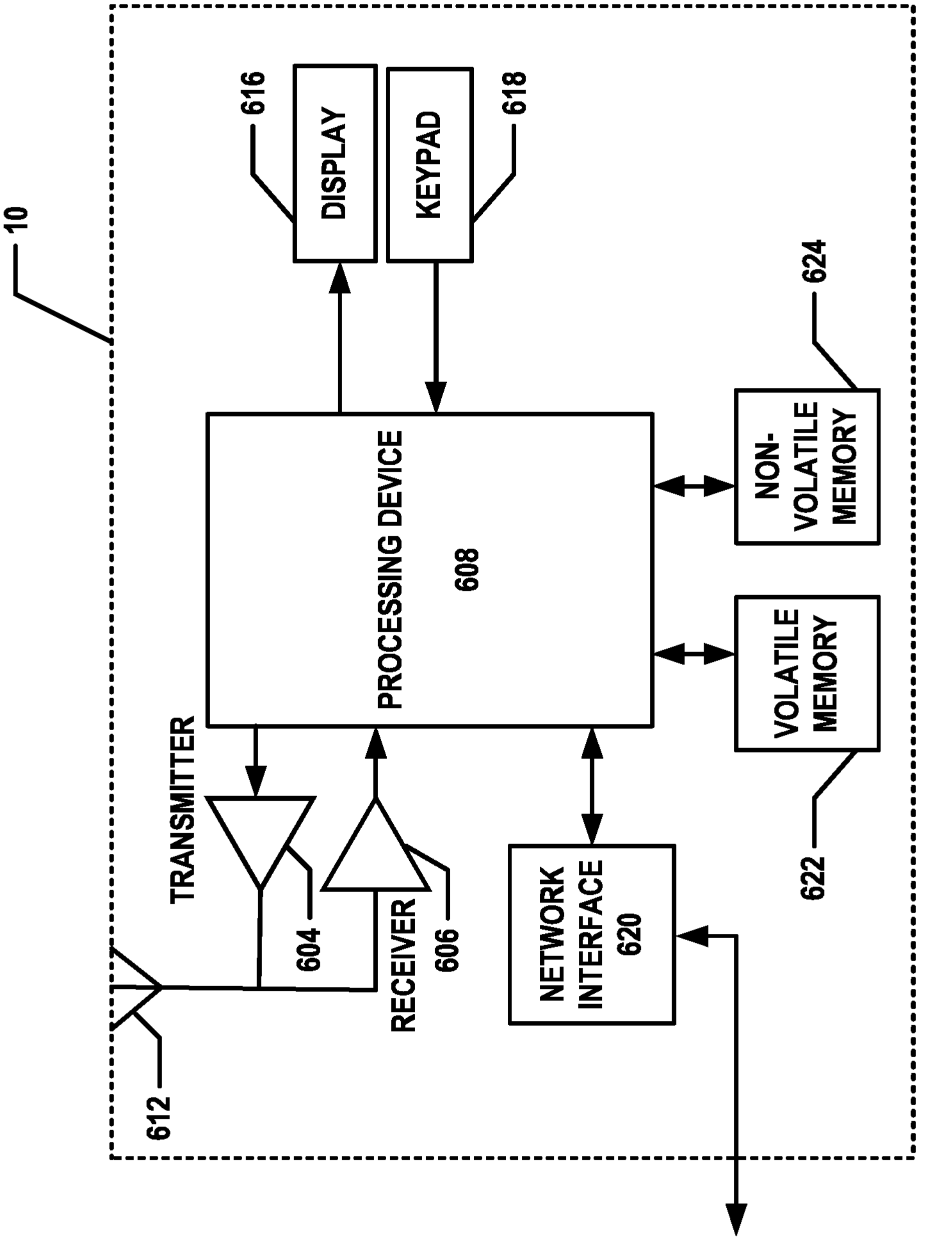

FIG. 6 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within appropriate engineering and/or manufacturing limits and/or within user measurement capabilities, unless otherwise indicated. Like numbers refer to like elements throughout.

In various systems, it may be desired to use be able to provide optical beams generated by an optical source (e.g., a laser) to multiple utilization locations within the system. For example, the system may be an atomic, molecular, and/or optical (AMO) system, such as an array of optical traps, a system for manipulating atomic objects, and/or the like. In various embodiments, an atomic object is an ion, atom, neutral or ionic molecule, and/or the like. For example, the system may be a quantum charge-coupled device (QCCD) quantum computer such as a trapped ion quantum computer where the optical beams may be used to perform cooling (e.g., sympathetic cooling), controlled quantum state evolution (e.g., via one or more quantum gates), quantum state reading, and/or the like of an atomic object confined by an atomic object confinement apparatus. In another example, the system may be an optics-based communication system that uses a multiplexing technique to increase system bandwidth. For example, various embodiments of a fast frequency-tunable optical relay may be used as multiplexers, de-multiplexers, and/or in applications where one may otherwise use an array waveguide grating (AWG), Echelle grating, and/or wavelength/frequency selective coupling element to multiplex or de-multiplex optical beams and/or signals. In various embodiments, the fast frequency-tunable optical relay is arranged and/or configured to be able to switch between output optical beam configurations on timescales in the range of 100 ns to 100 μs. For example, in an example embodiment, the fast frequency-tunable optical relay is arranged and/or configured to switch between output optical beam configurations on timescales of approximately 400 ns to 40 μs.

Various embodiments of the fast frequency-tunable optical relay provides technical improvements over conventional optical relays by providing a frequency-tunable optical array with a comparatively small form factor, reduced power consumption, and flexibility to provide a single output optical beam or to split the incoming optical power arbitrarily between a plurality of output optical beams. Thus, various embodiments provide technical solutions to various technical problems in the fields of optical relays, optical multiplexers/de-multiplexers, and similar wavelength/frequency selective optical components.

An Example Fast Frequency-Tunable Optical Relay

FIG. 1 provides a top view and FIG. 2 provides a side view of an example fast frequency-tunable optical relay 100 (also referred to herein as optical relay 100). The dashed lines indicate a propagation path substantially in the first-direction (e.g., as defined by the optical path of an input optical beam 5); the dotted lines indicate propagation paths substantially opposite the first-direction and the optical path of the output optical beams 10A, 10B, 10C, 10D as the output optical beams exit the optical relay 100; and the dot-dash lines indicate propagation paths that are traversed substantially in the first-direction and opposite the first-direction. For example, the dashed lines indicate incoming beam paths, the dotted lines indicate outgoing beam paths, and the dot-dashed lines indicate beam paths that are both the incoming and outgoing beam paths.

In various embodiments, the optical relay 100 comprises one AOD 110. For example, in various embodiments, the optical relay 100 comprises only one AOD 110. In various embodiments, the single AOD 110 is configured to perform both frequency tuning and beam directing functions of the optical relay 100. In various embodiments, the AOD 110 is an acousto-optical deflector. The AOD 110 comprises an electrical input 120 and is configured to receive an electrical driving signal (e.g., an oscillating radio-frequency (RF) electrical voltage) therethrough. The electrical driving signal is characterized by a driving frequency profile.

In various embodiments, the AOD 110 is configured as a double-pass AOD. For example, an input optical beam (e.g., a laser beam or other optical signal) may enter the AOD 110 from a first side 112 of the optical relay 100. For example, the input optical beam may be propagating in a first-direction (e.g., the positive x-direction as illustrated in FIGS. 1 and 2) and enter the AOD 110 from the first side 112. The AOD 110 may modulate and/or deflect the input optical beam based at least in part on an electrical driving signal (e.g., based at least in part on the driving frequency profile of the electrical driving signal) received via the electrical input 120 of the AOD 110 as the optical beam passes from the first side 112 of the optical relay 100 to the second side 114 of the optical relay 100 via the AOD 110.

In various embodiments, the optical beam is propagated back through the AOD 110 from the second side 114 of the optical relay 100 to the first side 112 of the optical relay via the AOD 110. The AOD 110 further modulates and/or deflects the optical beam based at least in part on the electrical driving signal (e.g., based at least in part on the driving frequency profile of the electrical driving signal) received via the electrical input 120 of the AOD 110 as the optical beam passes from the second side 114 of the optical relay 100 to the first side 112 of the optical relay 100 via the AOD 110. Thus, one or more output optical beams exit the AOD 110 to the first side of the optical relay 100.

The one or more output optical beams are substantially propagating anti-parallel to the first-direction (e.g., are substantially propagating in the negative x-direction). For example, the component of the propagation (e.g., component of the respective group velocities) of the one or more output optical beams in a second-direction (e.g., the y-direction as illustrated in FIGS. 1 and 2) are substantially equal zero. The component of the propagation (e.g., component of the respective group velocities) of the one or more output optical signals in a third-direction (e.g., the z-direction as illustrated in FIGS. 1 and 2) may be non-zero but have an amplitude that is smaller than the amplitude of the respective component of the propagation (e.g., the component of the respective group velocities) of the one or more output optical signals in the first-direction. In various embodiments, the first, second, and third-directions are transverse to one another. In various embodiments, the first, second, and third-directions are a basis set of three-dimensional space. For example, the first, second, and third-directions may define an orthogonal coordinate set (e.g., a Cartesian coordinate set).

The optical relay 100 further comprises an output optical element array. In various embodiments, the output optical element array comprises a plurality of output optical elements 160 (e.g., 160A, 160*b*, 160C, 160D). In various embodiments, each of the plurality of output optical elements is coupled to a respective channel or output optical path. For example, an output optical path is configured to provide an output optical beam provided thereto by a corresponding output optical element 160 to a respective beam utilization location. In various embodiments, a beam utilization location is a specific location, a series or sequence of specific locations, a one, two, or three-dimensional region in space, and/or the like where the output optical beam is used to perform one or more functions (e.g., cause a controlled quantum state evolution of an atomic object, form an optical trap, be incident on an optical sensor and/or component of a photonic circuit, and/or the like). In various embodiments, which channels and/or output optical paths are provided with an output optical beam at a given point in time is determined based on the driving frequency profile of the electrical driving signal applied to the electrical input 120. For example, the distribution of optical power provided to each channel as output from the optical relay 100 (e.g., via the output optical beams) is controlled by the driving frequency profile of the electrical driving signal applied to the electrical input 120. In various embodiments, the optical relay 100 has at least two channels and/or is configured to be coupled to at least two distinct output optical paths. In various embodiments, the optical relay 100 has two to eight channels and/or is configured to be coupled to two to eight distinct output optical paths. In various embodiments, the number of channels and/or distinct output optical paths is constrained by the physical size of the optical elements of the reflective optical assemblies 145, output optical elements 160, and/or the like.

In various embodiments, the driving frequency profile determines which channels are on (e.g., to which channels optical power is provided). For example, each channel is associated with a frequency range of the driving frequency profile. The portion of the optical power that is outputted to a respective channel is determined based on and/or is proportional to the portion of electrical power of the electrical driving signal that is present in the part of the driving frequency profile corresponding to the respective frequency range corresponding to the respective channel. For example, if a third of the electrical power of the electrical driving signal is in a first frequency range corresponding to a first channel and a two-thirds of the electrical power of the electrical driving signal is in a second frequency range corresponding to a second channel, at least some of the optical power output by the optical relay 100 will be provided through the first channel and a larger portion (compared to the optical power output to the first channel) of the optical power output by the optical relay 100 will be provided through the second channel. If the optical relay 100 comprises a third channel corresponding to a third frequency range and the driving frequency profile of the electrical driving signal includes approximately no power in the third frequency range, then approximately no optical power is provided through the third channel.

In various embodiments, the output optical elements comprise mirrors, lenses, gratings, prisms, and/or other optical elements. In various embodiments, an output optical element is configured to have a respective output optical beam of the one or more output optical beams 10A, 10B, 10C, 10D incident thereon and to reflect, diffract, and/or the like the respective output optical beam into a respective output path. As illustrated in FIGS. 1 and 2, the respective output optical paths are each either substantially parallel or anti-parallel to the second-direction. For example, each output optical element of the plurality of output optical elements is configured to provide a respective output optical beam substantially propagating either parallel or anti-parallel to the second-direction (e.g., the amplitude of the second-direction component of the group velocity of the respective output optical beam is greater than the respective amplitudes of the first and third-direction components of the group velocity of the respective output optical beam).

In various embodiments, the plurality of output optical elements are spaced apart from one another in the third-direction. The output optical beam of the one or more output optical beams that is incident on a respective output optical element is determined based on the position of the respective output optical element in the third-direction with respect to the AOD 110. For example, each of the one or more output optical beams exits the AOD 110 into the first side 112 of the optical relay propagating substantially anti-parallel to the first-direction, with a substantially zero group velocity component in the second-direction, and with a distinct group velocity component in the third-direction. The distinct group velocity component in the third-direction is determined based at least in part on at least a portion of the driving frequency profile of the electrical driving signal applied to the electrical input 120 while the optical beam was propagating through the AOD 110. For example, each of the one or more output optical beams has a unique distinct group velocity component in the third-direction that is different from each of the distinct group velocity components in the third-direction of the other output optical beams. For example, each of the one or more output optical beams is uniquely associated to one of the output optical elements based on the position of the output optical element with respect to the AOD 110 in the third-direction. In an example embodiment, the respective output optical beam associated with an output optical element is independent of the position of the output optical element in the first-direction and the second-direction (given that the output optical component is located appropriately on the first side 112 of the optical relay 100). For example, the first output optical element 160A and the second output optical element 160B are located at similar first and second-direction positions with respect to the AOD 110 but are located at different third-direction positions with respect to the AOD 110.

In various embodiments, each of the one or more output optical beams exits the AOD 110 to the first side 112 of the optical relay 100 having a group velocity that is substantially in the first-direction (e.g., the first-direction component is greater than the second-direction and the third-direction components of the group velocity of the output optical beams). In various embodiments, each of the one or more output optical beams exits the AOD 110 to the first side 112 of the optical relay 100 having a group velocity that where the second-direction component of the group velocity is substantially equal to zero. In various embodiments, each of the one or more output optical beams exits the AOD 110 to the first side 112 of the optical relay 100 having a group velocity that where the third-direction component of the group velocity is dependent on at least a portion of the driving frequency profile of the electrical driving signal applied to the electrical input 120 while the optical beam(s) resulting in the output optical beam propagated through the AOD 110.

As a result, the electrical driving signal may be selected and/or generated to generate one or more desired output optical beams at given point in time. For example, the electrical driving signal may be generated such that the electrical driving signal is characterized by a driving frequency profile of configured to cause the distribution of optical power to be distributed among the one or more output optical beams 10 in a desired manner (e.g., with respective selected amounts of optical power provided to each channel). For example, for a first period of time, it may be desired to only generate a first output optical beam 10A. The electrical driving signal applied for the first period of time is selected and/or generated to have a driving frequency profile that will result in only the first output optical beam 10A being generated. For a second period of time, it may be desired to generate a second output optical beam 10B and a third output optical beam 10C. The electrical driving signal applied for the second period of time is selected and/or generated to have a driving frequency profile that will result in the second output optical beam 10B and the third output optical beam 10C being generated. The switching time required to switch from generating the first optical beam 10A to generating the second optical beam 10B and the third optical beam 10C (e.g., the switching time required between the first period of time and the second period of time) is in the range of 100 ns to 100 μs (400 ns to 40 μs, 900 ns to 10 μs, approximately 3 μs, in some example embodiments). As should be understood, each of the respective output optical beams 10A, 10B, 10C, 10D may be generated individually or in various combinations by selection and/or generation of electrical driving signal with the appropriate driving frequency profile.

While FIGS. 1 and 2 illustrate the optical relay 100 being able to generate four output optical beams (e.g., having four output channels), various embodiments of the optical relay 100 are able to generate more or less than four output optical beams. For example, various embodiments of the optical relay 100 have two to eight or more output channels.

In various embodiments, in addition to the AOD 110 and the array of output optical elements, the optical relay 100 comprises a parallelizing lens 130 and/or a plurality of reflective optical assemblies 145A, 145B, 145C, 145D. In various embodiments, the parallelizing lens 130 and/or plurality of reflective optical assemblies 145 are disposed on a second side 114 of the optical relay 100. As should be understood, the first side 112 of the optical relay 100 is separated from the second side 114 of the optical relay 100 by the AOD 110.

In various embodiments, one or more intermediate optical beams exits the AOD 110 to the second side 114 of the optical relay 100. In various embodiments, the one or more intermediate optical beams are the result of the input optical beam being modulated and/or deflected by the AOD 110 as the input optical beam passed through the AOD 110 from the first side 112 of the optical relay 100 to the second side 114 of the optical relay 100.

Due to the deflection the optical beam passing through the AOD 110 based at least in part on the electrical driving signal, the one or more intermediate optical beams will be deflected from the first-direction. In various embodiments, the one or more intermediate optical beams are substantially propagating in the first-direction (e.g., in the positive x-direction). However, the respective propagation directions of the one or more intermediate beams also include components in a second-direction (e.g., the y-direction as illustrated in FIGS. 1 and 2) and a third-direction (e.g., the z-direction as illustrated in FIGS. 1 and 2). The relative amplitude of the second and third-direction propagation components (e.g., the components of the group velocity of an intermediate optical beam in the second and third-directions, respectively) compared to the first-direction propagation component (e.g., the component of the group velocity of the intermediate optical beam in the first-direction) is based at least in part on the frequency profile of the electrical driving signal. For example, the amount of deflection experienced by an optical beam passing through the AOD 110 is dependent on the frequency and/or frequencies of the electrical driving signal applied to the electrical input 120 as the optical beam is propagating through the AOD 110. The intermediate optical beams are said to be propagating substantially in the first-direction because the component of the propagation direction in the first-direction (e.g., the component of the group velocity of the intermediate optical beam in the first-direction) is greater than the respective components of the propagation direction in the second or third-directions (e.g., the respective components of the group velocity of the intermediate optical beam in the second or third-directions).

In various embodiments, the optical relay 100 further comprises a parallelizing lens 130. For example, in various embodiments, the parallelizing lens 130 is a cat's eye lens. In various embodiments, the parallelizing lens 130 is configured to have the one or more intermediate beams that are propagating with non-zero second-direction components of their group velocities incident on a first surface 132 thereof. When an intermediate optical beam exits the second surface 134 of the parallelizing lens 130, the second-direction component of the group velocity of the intermediate beam is zero. In various embodiments, the parallelizing lens 130 is characterized by a focal length f and the parallelizing lens is located a distance f (in the first-direction) from the AOD 110. For example, the optical relay 100 is configured such that the intermediate optical beam exiting the AOD 110 travels a distance fin the first-direction and is then incident on the first surface 132 of the parallelizing lens 130, in various embodiments. In various embodiments, the one or more intermediate optical beams exiting the second surface 134 of the parallelizing lens 130 continue to propagate with respective group velocities having second-direction components that are substantially equal to zero.

In various embodiments, the optical relay 100 further comprises an array reflective optical assemblies 145. For example, the optical relay 100 comprises a plurality of reflective optical assemblies 145. In various embodiments, each reflective optical assembly 145 comprises a reflective component 150 (e.g., 150A, 150B, 150C, 150D). In various embodiments, the reflective components 150 are mirrors, retro-reflective prisms, and/or the like. In various embodiments, at least one of the reflective optical assemblies 145 includes a re-directing component 140 (e.g., 140A, 140B, 140C). In an example embodiment, a re-directing component 140 is a mirror (e.g., a sharp-edged mirror, D-mirror, and/or the like), a diffractive grating, and/or the like configured to redirect a respective intermediate optical beam to the reflective component 150 of the respective reflective optical assembly 145.

In various embodiments, as the input optical beam 5 propagates through the AOD 110 from the first side 112 of the optical relay to the second side 114 of the optical relay 100, the driving frequency profile of the electrical driving signal being applied to the electrical input 120 causes the optical beam propagating through the AOD 110 to be deflected from the central axis 105 of the AOD 110. In various embodiments, the central axis 105 is substantially parallel to and/or defines the first-direction. Thus, the intermediate optical beam that exits the AOD 110 to the second side of the optical relay 100 is propagating substantially in the first-direction (e.g., the first-direction component of the group velocity is larger than both the second-direction and third-direction components of the group velocity) and with a second-direction component that causes the intermediate optical beam (and/or at least a portion thereof) to form an angle $\theta$ (e.g., $\theta_A$, $\theta_B$, $\theta_C$, $\theta_D$) from the central axis 105 of the AOD 110 in a plane defined by the first-direction and the second-direction (e.g., transverse and/or perpendicular to the third-direction). The intermediate optical beam may similarly form an angle from the central axis 105 of the AOD 110 in a plane defined by the first-direction and the third-direction (e.g., transverse and/or perpendicular to the second-direction). In various embodiments, the intermediate optical beam may comprise one or more distinct optical beams and/or a diverging optical beam formed by the deflecting of the input optical beam 5 by the AOD 110 responsive to the electrical driving signal applied to the electrical input 120.

The intermediate optical beam then interacts with the a parallelizing lens 130 which causes the group velocities of the distinct optical beams or of each portion of the diverging optical beam to be parallelized (e.g., to only have non-zero components in the first-direction). However, the distinct optical beams or each portion of the now-parallelized diverging optical beam is displaced from the central axis 105 by a characteristic amount. For example, will be displaced from the central axis 105 in the second and third-directions by an amount determined based on the first frequency $\nu_1$. For example, when the electrical driving signal is characterized by a driving frequency profile that comprises substantially only a first frequency $\nu_1$, the resulting intermediate optical beam forms an angle $\theta_A$ with respect to the central axis 105, prior to propagating through the parallelizing lens 130, and is a distance $\Delta y_A$ in the second-direction away from the central axis 105, after propagating through the parallelizing lens 130. When the driving frequency profile is changed to be substantially characterized by a second frequency $\nu_2$, the resulting intermediate optical beam will be displaced from the central axis 105 in the second and third-directions by an amount determined based on the second frequency $\nu_2$. For example, when the electrical driving signal is characterized by a driving frequency profile that comprises substantially only a second frequency $\nu_2$, the resulting intermediate optical beam forms an angle $\theta_B$ with respect to the central axis 105, prior to propagating through the parallelizing lens 130, and is a distance $\Delta y_B$ in the second-direction away from the central axis 105, after propagating through the parallelizing lens 130. As should be understood, an electrical driving signal having a more complicated driving frequency profile (e.g., more complicated than a single frequency) results in the distribution of the optical power of the input optical beam across different angles and/or a range of angles with respect to the central axis 105, prior to the intermediate optical beam propagating through the parallelizing axis 130, and different displacements and/or a range of displacements with respect to the central axis 105, after the intermediate optical beam propagates though the parallelizing axis 130.

The reflective optical assemblies 145, and/or components thereof, are disposed so as to interact with specific preselected portions of the intermediate optical beam. For example, the reflective optical assemblies 145 and/or components thereof, are disposed so as to interact with portions of the intermediate optical beam corresponding to respective frequency ranges of the driving frequency profile of the electrical driving signal applied to the electrical input 120.

For example, in various embodiments, a first element of each reflective optical assembly 145 (e.g., re-directing component 140A, 140B, 140C, reflective component 150D) that is closest to the parallelizing lens 130 (along the optical path of the corresponding intermediate optical beam) is spaced apart from the first elements of the other reflective optical assemblies 145 in the second-direction. For example, the first re-directing component 140A is located a first second-direction displacement $\Delta y_A$ from the central axis 105 of the AOD 110, the second redirecting component 140B is located a second second-direction displacement $\Delta y_B$ from the central axis 105 of the AOD 110, the third redirecting component 140B is located a third second-direction displacement $\Delta y_A$ from the central axis 105 of the AOD 110, and the fourth reflective component 150D is located a fourth second-direction displacement $\Delta y_A$ from the central axis 105 of the AOD 110. In various embodiments, the first element of each reflective optical assembly 145 (e.g., re-directing component 140A, 140B, 140C, reflective component 150D) that is closest to the parallelizing lens 130 (along the optical path of the corresponding intermediate optical beam) is spaced apart from the first elements of the other reflective optical assemblies 145 in the third-direction, in addition to be spaced apart in the second-direction.

For example, in a first embodiment, a first channel of the optical relay (corresponding to the first output optical element 160A and first reflective assembly 145A) is configured to pass an optical beam corresponding to a first frequency range $\nu_A$, ranging from $\nu_{A,min}$ to $\nu_{A,max}$, of the driving frequency profile of the electrical driving signal. For example, the first second-direction displacement $\Delta y_A$ from the central axis 105 is determined based on the amount of deflection the optical beam propagating through the AOD 110 while an electrical driving signal substantially characterized by one or more frequencies within the first frequency range $\nu_A$ is applied to the electrical input 120. A second channel of the optical relay (corresponding to the second output optical element 160B and second reflective assembly 145B) is configured to pass an optical beam corresponding to a second frequency range $\nu_B$, ranging from $\nu_{B,min}$ to $\nu_{B,max}$, of the driving frequency profile of the electrical driving signal. Thus, the second second-direction displacement $\Delta y_B$ from the central axis 105 is determined based on the amount of deflection the optical beam propagating through the AOD 110 while an electrical driving signal substantially characterized by one or more frequencies within the second frequency range $\nu_B$ is applied to the electrical input 120. A third channel of the optical relay (corresponding to the third output optical element 160C and third reflective assembly 145C) is configured to pass an optical beam corresponding to a third frequency range $\nu_C$, ranging from $\nu_{C,min}$ to $\nu_{C,max}$, of the driving frequency profile of the electrical driving signal. Thus, the third second-direction displacement $\Delta y_C$ from the central axis 105 is determined based on the amount of deflection the optical beam propagating through the AOD 110 while an electrical driving signal substantially characterized by one or more frequencies within the third frequency range $\nu_C$ is applied to the electrical input 120. A fourth channel of the optical relay (corresponding to the fourth output optical element 160D and fourth reflective assembly 145D) is configured to pass an optical beam corresponding to a fourth frequency range $\nu_D$, ranging from, of the driving frequency profile of the electrical driving signal. In particular, fourth second-direction displacement $\Delta y_D$ from the central axis 105 is determined based on the amount of deflection the optical beam propagating through the AOD 110 while an electrical driving signal substantially characterized by one or more frequencies within the fourth frequency range $\nu_D$ is applied to the electrical input 120. The reflective optical assemblies 145, and/or components thereof, are similarly disposed with appropriate third-direction displacements from the central axis 105 based on the frequency range of the respective channels. In various embodiments, the frequency ranges of the different channels (e.g., $\nu_A$, $\nu_B$, $\nu_C$, $\nu_D$) do not overlap one another.

In various embodiments, the frequency ranges $\nu_i$ have a width $\Delta\nu_i=\nu_{i,max}-\nu_{i,min}$ in the range of one to twenty MHz. For example, in an example embodiment, each of the frequency ranges has a respective width that is substantially equal to 10 MHz. For example, in one embodiment, one of the frequency ranges $\nu_i$ is defined by $\nu_{i,min}$=80 MHz and $\nu_{i,max}$=90 MHz. Various frequency ranges may be defined in various embodiments, as appropriate for the application, the frequency bandwidth of the AOD 110, and the electrical signal generator(s) 70 configured to generate the electrical driving signal (see FIG. 4).

Once the intermediate optical beam and/or a portion thereof interacts with and/or reflects from the reflective component 150 of a respective reflective assembly 145, the intermediate optical beam and/or portion thereof propagates back toward the parallelizing lens 130 (via re-directing component 140 for at least some channels). In various embodiments, the reflective optical assembly 145 reflects the portion of the intermediate optical beam incident thereon so that the portion of the intermediate optical beam returns to the parallelizing lens 130 and the AOD 110 on a similar but slightly different path in order to spatially separate the portion of the intermediate optical beam propagating toward the reflective optical assembly 145 and the portion of the intermediate optical beam propagating away from the reflective optical assembly 145.

When the intermediate optical beam and/or portion thereof is incident on the second surface 134 of the parallelizing lens, the intermediate optical beam and/or portion thereof has a group velocity that is substantially opposite the first-direction (e.g., the second-direction and the third-direction components are substantially equal to zero). When the intermediate optical beam and/or portion thereof traverses the parallelizing lens 130 from the second surface 134 to the first surface 132, the parallelizing lens 130 deflects the intermediate optical beam and/or portion thereof toward the central axis 105 at the surface of the AOD 110. The intermediate optical beam and/or portion thereof then propagates through the AOD 110 from the second side 114 to the first side 112 of the optical relay 100 such that the one or more output optical beams exit the AOD 110 to the first side 112 of the optical relay 100. The one or more output optical beams then interact with respective ones of the output optical elements 160 to provide output optical beams to the respective output optical paths.

In various embodiments, as the one or more output optical beams propagate toward respective output optical elements 160 after exiting the AOD 110 to the first side of the optical relay 100, at least the first-direction (e.g., x-direction as illustrated in FIGS. 1 and 2) component and the second-direction (e.g., y-direction as illustrated in FIGS. 1 and 2) component of the direction of propagation (e.g., the group velocity) of the one or more output optical beams are independent of the driving frequency profile. Moreover, for a particular output optical beam, such as output optical beam 10A, for example, the direction of propagation (e.g., the group velocity) of the output optical beam 10A is independent of the driving frequency profile of the electrical driving signal for any frequency or set of frequencies within the corresponding frequency range. For example, for the first channel corresponding to first frequency range $\nu_A$, ranging from $\nu_{A,min}$ to $\nu_{A,max}$ of the driving frequency profile of the electrical driving signal, the direction of propagation of the output optical beam is the same when the driving frequency profile comprises frequency $\nu_1$ (and not $\nu_2$) as when the driving frequency profile comprises frequency $\nu_2$ (and not $\nu_1$), when $\nu_1$ and $\nu_2$ are both within the first frequency range $\nu_A$ (e.g., $\nu_{A,min} \le \nu_1 \le \nu_2 \le \nu_{A,max}$).

As should be understood, the optical frequency of the output optical beam is shifted with respect to the optical frequency of the input optical beam based on the driving frequency profile of the electrical driving signal. Thus, each channel corresponds to an output optical beam characterized by a particular optical frequency and/or optical frequency range that is shifted with respect to the optical frequency of the input optical beam based at least in part on the frequency range of the driving frequency profile corresponding to the channel.

Example Method of Using a Fast Frequency-Tunable Optical Array

In various embodiments, a controller of an AOM system (e.g., controller 30, see FIG. 4) is configured to control one or more optical relays 100 to provide frequency-tuned optical beams to respective utilization locations via one or more channels and/or output optical paths. FIG. 3 provides a flowchart illustrating various processes, procedures, operations, and/or the like that may be performed, for example, by a processing device 505 of a controller 30 (e.g., based on and/or as a result of executing computer-executable instructions received via communication interface 520 and/or stored in memory 510), to provide one or more frequency-tuned optical beams to respective utilization locations using a fast frequency-tunable optical relay 100.

Starting at step/operation 302, the controller 30 determines than an optical beam is to be applied along a particular optical path (e.g., to a particular utilization location). For example, when the controller 30 is the controller of a quantum computer 410, the optical beam may be used to perform a cooling operation (e.g., via a sympathetic cooling atomic object), perform a quantum logic gate, perform a qubit reading function, perform a shelving function as part of a qubit reading function, perform a qubit state preparation function, and/or the like. For example, the controller 30 may be configured to control various components of the quantum computer 410 to cause the quantum computer 410 to execute a quantum program and/or quantum circuit. As part of performing the quantum program and/or quantum circuit, the optical beam is to be applied along the particular optical path. Based on processing the quantum program and/or quantum circuit (e.g., in preparing of machine level instructions for performing the quantum program and/or quantum circuit), the controller 30 determines that the optical beam is to be applied along the particular optical path at a particular time during the performance of the quantum program and/or quantum circuit.

At step/operation 304, the controller 30 determines a particular frequency range $\nu_i$ associated with the particular optical path. For example, the controller 30 may store and/or otherwise have access to a look up table and/or other mechanism for determining a particular frequency range $\nu_i$ associated with the particular optical path. For example, the particular frequency range $\nu_i$ associated with the particular optical path is a frequency range of the driving frequency profile of the electrical driving signal to be applied to the electrical input 120 that should include an appropriate (non-zero) amount of power to cause the optical relay 100 to provide an output optical beam 10 (e.g., a non-zero amount of optical power) to the particular optical path.

At step/operation 306, the controller 30 causes the optical source 64C to provide an input optical beam 5. For example, the controller 30 may control a laser driver, for example, via a controller driver element 515 to cause the optical source 64C to provide an input optical beam. In various embodiments, the optical source 64C comprises a laser and one or more optical components configured to condition the input optical beam. The input optical beam is provided to the optical relay 100 via the input optical path 62.

At step/operation 308, the controller 30 causes an electric signal generator 70 to generate and provide an electrical driving signal. The electrical driving signal is characterized by a driving frequency profile that includes a non-zero amount of power in the particular frequency range $\nu_i$. The electrical driving signal is provided to the electrical input 120 of the optical relay 100.

The input optical beam that was provided to the optical relay 100 propagates through the AOD 110 as the electrical driving signal is applied to the electrical input 120. At least a portion of the input optical beam is deflected in accordance with the particular frequency range $\nu_i$ as the input optical beam propagates through the AOD 110 from the first side 112 of the optical relay 100 to the second side 114 of the optical relay 100. The intermediate optical beam exits the AOD 110 to the second side 114 of the optical relay 100 and interacts with the parallelizing lens 130. At least a portion of the intermediate optical beam interacts with a reflective optical assembly 145 that is positioned in the second and third directions (with respect to the central axis 105 of the AOD 110) based on the amount of deflection imparted to an optical beam propagating through the AOD 110 while an electrical driving signal characterized by a frequency in the particular frequency range $\nu_i$ is applied to the electrical input 120. For example, the at least a portion of the intermediate optical beam interacts with a reflective optical assembly 145 that corresponds to the same channel as the particular optical path.

The at least a portion of the intermediate optical beam interacts with the reflective optical assembly and is reflected back toward the parallelizing lens 130. The parallelizing lens deflects the at least a portion of the intermediate optical beam back into the AOD 110. As the at least a portion of the intermediate optical beam propagates through the AOD 10 from the second side 114 to the first side 112 of the optical relay 100, the at least a portion of the intermediate optical beam is deflected in accordance with the particular frequency range $\nu_i$. In particular, the deflection in the second direction experienced by the at least a portion of the intermediate optical beam propagating through the AOD 110 from the second side 114 to the first side 112, is substantially equal in amplitude and opposite in direction to the deflection in the second direction experienced by the at least a portion of the input optical beam propagating through the AOD 110 from the first side 112 to the second side 114. As a result, the total deflection in the second direction experienced by the output optical beam(s) is substantially equal to zero.

The deflection in the third direction experienced by the at least a portion of the input optical beam propagating through the AOD 110 from the first side 112 to the second side 114 and by the at least a portion of the intermediate optical beam propagating through the AOD 110 from the second side 114 to the first side 112, however, do not cancel one another out so that the corresponding output optical beam is deflected in the third direction away from the central axis 105 of the optical relay 100.

The output optical beam exits the AOD 110 to the first side 112 of the optical relay 100. The output optical beam interacts with the output optical element corresponding to the same channel as the particular optical path. The output optical element reflects, deflects, diffracts, and/or the like the output optical element into the output optical path 68 corresponding to the particular optical path. The output optical beam then propagates along the particular optical path to the corresponding utilization location.

Example AOM System Including an Example Optical Beam Delivery System

FIG. 4 provides a schematic diagram of an example AOM system that includes an example optical beam delivery system including an optical relay 100. The example AOM system shown in FIG. 4 is a quantum computer system 400 comprising an atomic object confinement apparatus 50 (e.g., an ion trap) having at least one optical beam delivery system comprising an optical relay 100, in accordance with an example embodiment. In various embodiments, the quantum computer system 400 comprises a computing entity 15 and a quantum computer 410. In various embodiments, the quantum computer 410 comprises a controller 30, a cryogenic and/or vacuum chamber 40 enclosing an atomic object confinement apparatus 50, and one or more manipulation sources 60. In an example embodiment, the one or more manipulation sources 60 comprise one or more optical sources 64 (e.g., 64A, 64B, 64C). In an example embodiment, an optical source 64 is a laser (e.g., UV laser, visible laser, microwave laser, and/or the like).

In various embodiments, the one or more manipulation sources 60 are configured to generate and/or provide manipulation signals (e.g., optical beams) configured to manipulate and/or cause a controlled quantum state evolution of one or more ions within the atomic object confinement apparatus 50. For example, in an example embodiment, wherein the one or more manipulation sources 60 (e.g., the one or more optical sources 64) comprise one or more lasers, the lasers may provide one or more optical beams and/or laser beams to the atomic object confinement apparatus 50 within the cryogenic and/or vacuum chamber 40. The one or more optical sources 64 each provide an optical beam and/or the like to the atomic object confinement apparatus 50 via a corresponding beam delivery system 66 (e.g., 66A, 66B, 66C). In various embodiments, at least one beam delivery system 66C comprises an optical relay 100. In various embodiments, a beam delivery system 66C comprises one or more input optical paths 62 each configured to receive a respective input optical beam from a respective optical source 64C and provide the respective input optical beam to a respective frequency-tunable optical relay 100. The at least one beam delivery system 66C comprises one or more output optical paths (e.g., at least one optical path for each channel of the optical relay 100) each configured to receive a respective output optical beam 10 from a respective output optical element 160 and provide the respective output optical beam 10 to at least one respective beam utilization location (e.g., of the atomic object confinement apparatus 50).

The optical relay 100 may be controlled by the controller 30 via one or more electrical driving signals generated by the electrical signal generator(s) 70 provided to the electrical input 120 of the optical relay 100. For example, the controller 30 may cause one or more electrical signal generators and/or the like to provide the electrical driving signal. Via the optical relay 100 an optical source 64C may provide a frequency-tuned optical beam, via one or more selected beam paths of the beam delivery system 66C, to respective utilization locations of the atomic object confinement apparatus 50.

In various embodiments, a computing entity 15 is configured to allow a user to provide input to the quantum computer 410 (e.g., via a user interface of the computing entity 15) and receive, view, and/or the like output from the quantum computer 410. The computing entity 15 may be in communication with the controller 30 of the quantum computer 410 via one or more wired or wireless networks 20 and/or via direct wired and/or wireless communications. In an example embodiment, the computing entity 15 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the electrical signal generator(s), cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects (e.g., ions) within the atomic object confinement apparatus 50 (e.g., ion trap). In various embodiments, the atomic objects trapped within the atomic object confinement apparatus 50 are used as qubits of the quantum computer 410.

Technical Advantages

Various embodiments provide optical relays 100 that each comprise a single AOD 110. The various embodiments of the fast frequency-tunable optical relay 100 provide technical improvements over conventional optical relays by providing a frequency-tunable optical array with a comparatively small form factor, reduced power consumption, and having the flexibility to provide a single output optical beam or to split the incoming optical power arbitrarily between a plurality of output optical beams. Thus, various embodiments provide technical solutions to various technical problems in the fields of optical relays, optical multiplexers/demultiplexers, and similar wavelength/frequency selective optical components.

Exemplary Controller

In various embodiments, an optical relay 100 is part of a beam delivery system 66 that is incorporated into a quantum computer 410 or other AOM system. In various embodiments, a quantum computer 410 further comprises a controller 30 configured to control various elements of the quantum computer 410. For example, the controller 30 may be configured to control the electric signal generator(s) 70 configured to provide electrical driving signals to control the frequency tuning and output optical path selection of the optical relay 100. The controller 30 may be further configured to control a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 5, in various embodiments, the controller 30 may comprise various controller elements including processing elements 505, memory 510, driver controller elements 515, a communication interface 520, analog-digital converter elements 525, and/or the like. For example, the processing elements 505 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 505 of the controller 30 comprises a clock and/or is in communication with a clock.

For example, the memory 510 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 510 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 510 (e.g., by a processing element 505) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 515 may include one or more drivers and/or controller elements each configured to control one or more drivers. In various embodiments, the driver controller elements 515 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 505). In various embodiments, the driver controller elements 515 may enable the controller 30 to operate a manipulation source 60 (e.g., optical source 64C) to provide an input optical beam, control electric signal generator(s) 70 to provide respective electrical driving signals to respective electrical inputs 120, and/or the like. In various embodiments, the driver controller elements 515 enable the controller 30 to control and/or operate various drivers (e.g., laser drivers; vacuum component drivers; cryogenic and/or vacuum system component drivers; and/or the like). In various embodiments, the controller 30 comprises means for communicating and/or receiving signals from one or more optical receiver components such as cameras, MEMS cameras, CCD cameras, photodiodes, photomultiplier tubes, and/or the like. For example, the controller 30 may comprise one or more analog-digital converter elements 525 configured to receive signals from one or more optical receiver components, calibration sensors, and/or the like.

In various embodiments, the controller 30 may comprise a communication interface 520 for interfacing and/or communicating with a computing entity 15. For example, the controller 30 may comprise a communication interface 520 for receiving executable instructions, command sets, and/or the like from the computing entity 15 and providing output received from the quantum computer 410 (e.g., from an optical collection system) and/or the result of a processing the output to the computing entity 15. In various embodiments, the computing entity 15 and the controller 30 may communicate via a direct wired and/or wireless connection and/or one or more wired and/or wireless networks 20.

Exemplary Computing Entity

FIG. 6 provides an illustrative schematic representative of an example computing entity 15 that can be used in conjunction with embodiments of the present invention. In various embodiments, a computing entity 15 is configured to allow a user to provide input to the quantum computer 410 (e.g., via a user interface of the computing entity 15) and receive, display, analyze, and/or the like output from the quantum computer 410.

As shown in FIG. 6, a computing entity 15 can include an antenna 612, a transmitter 604 (e.g., radio), a receiver 606 (e.g., radio), and a processing element 608 that provides signals to and receives signals from the transmitter 604 and receiver 606, respectively. The signals provided to and received from the transmitter 604 and the receiver 606, respectively, may include signaling information/data in accordance with an air interface standard of applicable wireless systems to communicate with various entities, such as a controller 30, other computing entities 10, and/or the like. In this regard, the computing entity 15 may be capable of operating with one or more air interface standards, communication protocols, modulation types, and access types. In various embodiments, the computing entity 15 comprises a network interface 620 configured to enable communication between the computing entity 15 and the controller 30 and/or various other computing apparatuses. For example, the computing entity 15 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 15 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 15 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 15 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 15 can also download changes, add-ons, and updates, for instance, to its firmware, software (e.g., including executable instructions, applications, program modules), and operating system.

The computing entity 15 may also comprise a user interface device comprising one or more user input/output interfaces (e.g., a display 616 and/or speaker/speaker driver coupled to a processing element 608 and a touch screen, keyboard, mouse, and/or microphone coupled to a processing element 608). For instance, the user output interface may be configured to provide an application, browser, user interface, interface, dashboard, screen, webpage, page, and/or similar words used herein interchangeably executing on and/or accessible via the computing entity 15 to cause display or audible presentation of information/data and for interaction therewith via one or more user input interfaces. The user input interface can comprise any of a number of devices allowing the computing entity 15 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the computing entity 15 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 15 can collect information/data, user interaction/input, and/or the like.

The computing entity 15 can also include volatile storage or memory 622 and/or non-volatile storage or memory 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 15.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A frequency-tunable optical relay comprising:

one acousto-optic device (AOD) in a double pass configuration and configured to receive (a) an input optical beam propagating in a first direction toward the AOD from a first side of the AOD and (b) an electrical driving signal; and an output optical element array comprising a plurality of output optical elements disposed on the first side of the AOD, wherein:

each output optical element of the plurality of output optical elements is configured to provide a respective output optical beam substantially propagating either parallel or anti- parallel to a second direction, and the plurality of output optical elements are spaced apart from one another in a third direction, the third direction being transverse to both the first direction and the second direction.

2. The frequency-tunable optical relay of claim 1, further comprising:

a plurality of reflective optical assemblies disposed on a second side of the AOD, the second side of the AOD being opposite the first side of the AOD; and a parallelizing lens disposed between the AOD and the plurality of reflective optical assemblies, wherein each reflective optical assembly of the plurality of reflective optical assemblies corresponds to an output optical element of the plurality of output optical elements, and wherein each reflective optical assembly of the plurality of reflective optical assemblies is configured to cause at least a portion of an intermediate optical beam that exited the AOD to the second side of the AOD and propagated through the parallelizing lens to return to the AOD via the parallelizing lens.

3. The frequency-tunable optical relay of claim 2, wherein each output optical element of the plurality of output optical elements and each reflective optical assembly corresponds to a respective frequency range of the electrical driving signal.

4. The frequency-tunable optical relay of claim 3, wherein the respective frequency range corresponding to a respective reflective optical assembly of the plurality of reflective optical assemblies is determined by a physical location of at least one component of the respective reflective optical assembly with respect to the AOD.

5. The frequency-tunable optical relay of claim 3, wherein the respective frequency range corresponding to a respective output optical element of the plurality of output optical elements is determined based on a position of the respective output optical element in the third direction.

6. The frequency-tunable optical relay of claim 5, wherein the respective frequency range corresponding to a respective output optical element of the plurality of output optical elements is independent of a position of the respective output optical element in the first direction and the second direction.

7. The frequency-tunable optical relay of claim 3, wherein the respective frequency range has a range width of 1 to 20 MHz.

8. The frequency-tunable optical relay of claim 2, wherein each reflective optical assembly of the plurality of reflective optical assemblies comprises a retro-reflecting prism.

9. The frequency-tunable optical relay of claim 8, wherein at least one reflective optical assembly of the plurality of reflective optical assemblies comprises a sharp-edged mirror configured to direct the at least a portion of the intermediate optical beam to the retro-reflecting prism of the at least one reflective optical assembly.

10. The frequency-tunable optical relay of claim 2, wherein the parallelizing lens is a cat's eye lens.

11. The frequency-tunable optical relay of claim 2, wherein the parallelizing lens defines a focal length and the parallelizing lens is disposed a distance from the AOD corresponding to the focal length.

12. The frequency-tunable optical relay of claim 1, wherein the plurality of output optical elements comprises two to eight optical elements.

13. The frequency-tunable optical relay of claim 1, wherein a driving frequency profile of the electrical driving signal controls which one or more output optical elements of the plurality of output optical elements provides a respective output optical beam.

14. The frequency-tunable optical relay of claim 1, wherein the AOD is configured to modulate a frequency profile of the input optical beam based at least in part on the electrical driving signal.

15. An optical beam delivery system, the system comprising:

one or more input optical paths each configured to:

receive a respective input optical beam from a respective beam source, and provide the respective input optical beam to a respective frequency-tunable optical relay; and the respective frequency-tunable optical relay, wherein the respective frequency-tunable optical relay comprises:

one acousto-optic device (AOD) in a double pass configuration and configured to receive (a) the respective input optical beam propagating in a first direction toward the AOD from a first side of the AOD and (b) a respective electrical driving signal, an output optical element array comprising a plurality of output optical elements disposed on the first side of the AOD, wherein each output optical element of the plurality of output optical elements is configured to provide a respective output optical beam substantially propagating either parallel or anti-parallel to a second direction, and the plurality of output optical elements are spaced apart from one another in a third direction, the third direction being transverse to both the first direction and the second direction, and one or more output optical paths each configured to receive a respective output optical beam from a respective output optical element and provide the respective output optical beam to at least one respective beam utilization location.

16. The optical beam delivery system of claim 15, wherein the at least one respective beam utilization location is at least one position within an atomic object confinement apparatus.

17. The optical beam delivery system of claim 15, wherein the respective frequency-tunable optical relay further comprises:

a plurality of reflective optical assemblies disposed on a second side of the AOD, the second side of the AOD being opposite the first side of the AOD; and a parallelizing lens disposed between the AOD and the plurality of reflective optical assemblies, wherein each reflective optical assembly of the plurality of reflective optical assemblies corresponds to an output optical element of the plurality of output optical elements, and wherein each reflective optical assembly of the plurality of reflective optical assemblies is configured to cause at least a portion of an intermediate optical beam that exited the AOD to the second side of the AOD and propagated through the parallelizing lens to return to the AOD via the parallelizing lens.

18. The optical beam delivery system of claim 17, wherein each output optical element of the plurality of output optical elements and each reflective optical assembly corresponds to a respective frequency range of the respective electrical driving signal, the respective frequency range that corresponds to a respective reflective optical assembly of the plurality of reflective optical assemblies is determined by a physical location of at least one component of the respective reflective optical assembly with respect to the AOD, and the respective frequency range corresponding to a respective output optical element of the plurality of output optical elements is determined based on a position of the respective output optical element in the third direction.

19. The optical beam delivery system of claim 15, wherein the AOD is configured to modulate a frequency profile of the respective input optical beam based at least in part on the respective electrical driving signal.

20. A method performed by a controller configured to control the provision of optical signals along one or more of a plurality of optical paths, the method comprising:

determining, based on one or more computer-executable instructions, one or more particular optical paths of the plurality of optical paths along which a respective optical beam is to be provided;

identifying a respective frequency range associated with a respective one of each of the one or more particular optical paths;

causing an optical source to provide an input optical beam; and causing an electrical driving signal having a frequency profile comprising at least one component corresponding to the respective frequency range to be applied to an acousto-optic device (AOD) of a respective frequency-tunable optical relay, wherein the respective frequency-tunable optical relay is configured to, responsive to receiving the electrical driving signal and the input optical beam by the AOD, provide the respective output optical beam to the one or more particular optical paths.

* * * * *